United States Patent [19]

Wollensak

[11] 3,919,332

[45] Nov. 11, 1975

[54] PHENOL PROCESS

[75] Inventor: John C. Wollensak, Bloomfield Hills, Mich.

[73] Assignee: Ethyl Corporation, Richmond, Va.

[22] Filed: June 25, 1973

[21] Appl. No.: 373,273

[52] U.S. Cl. ..... 260/624 R; 260/621 M; 260/619 R; 260/619 D; 260/620; 260/623 R
[51] Int. Cl.$^2$ .......................................... C07C 39/06
[58] Field of Search ........ 260/624 R, 624 C, 619 R, 260/621 M, 621 H, 521, 623 R, 613 D, 619 D, 620

[56] References Cited
UNITED STATES PATENTS

| | | | |
|---|---|---|---|
| 2,273,030 | 2/1942 | Fitzy et al. | 260/621 M |
| 2,289,001 | 7/1942 | Fitzy et al. | 260/621 M |
| 2,387,617 | 10/1945 | Schmidt et al. | 260/586 |
| 2,421,937 | 6/1947 | Havry | 260/566 |
| 3,462,497 | 8/1969 | Greco | 260/621 M |

FOREIGN PATENTS OR APPLICATIONS 87,142   1/1965   France

*Primary Examiner*—Bernard Helfin
*Assistant Examiner*—W. B. Lone
*Attorney, Agent, or Firm*—Donald L. Johnson; Robert A. Linn; Joseph D. Odenweller

[57] ABSTRACT

Aminobenzenes (e.g., aniline) are converted to the corresponding hydroxybenzene by reaction with water in the presence of a hydrogen transfer catalyst (e.g., palladium) and a reaction propagating agent selected from cyclohexanones and cyclohexylimines. The cyclohexylimine may be formed by initially adding a reducing agent (e.g., hydrogen) to the aminobenzene.

10 Claims, No Drawings

PHENOL PROCESS

BACKGROUND

Phenols are valuable intermediates for preparation of many useful compounds such as antioxidants and monomers used to produce plastics such as polyphenylene oxide. They also are useful as bactericides. While many phenols are readily available or, as in the case of alkylphenols, can be made by alkylating phenol by known methods, some phenols, however, are most difficult to obtain. For example, 2,6-diethylphenol cannot be readily obtained by the direct alkylation of phenol. The aminobenzene analog of some of these difficult to prepare phenols can be readily made. For example, 2,6-diethylaniline is obtained in good yield by the method of Kolka et al., U.S. Pat. No. 2,814,646.

SUMMARY OF THE INVENTION

According to the present invention, a process is provided for converting an aminobenzene to the corresponding phenol by reaction with water using a hydrogen transfer catalyst and a chain propagating amount of a cyclohexanone or cyclohexylimine.

DESCRIPTION OF THE PREFERRED EMBODIMENTS

A preferred embodiment of this invention is a process for converting the amine group of an aminobenzene to a hydroxy group, said process comprising reacting said aminobenzene with water in the presence of a hydrogen transfer catalyst and a reaction propagating agent selected from the group consisting of cyclohexanones, cyclohexylimines and mixtures thereof.

The starting aminobenzenes can be any aminobenzene having at least one hydrogen atom bonded to its amino nitrogen. The benzene ring to which the amine group is bonded may be part of a polynuclear aromatic group such as naphthalene, anthracene, phenanthrene, chrysene, pyrene, and the like. The aminobenzenes can also have other nuclear substituents such as alkyl, aryl, aralkyl, cycloalkyl, halogen, alkoxy, and the like. Likewise, the nuclear substituents may form a closed ring such as in the case of indene. Of the various aminobenzenes, the preferred are the mono-, di- and tri-nuclear aminobenzenes. In particular, the mono-nuclear aminobenzenes, generally referred to as "anilines," are most preferred.

The preferred alkyl-substituted aminobenzenes are those in which the alkyl group contains from 1 to about 20 carbon atoms. Examples of these are 2-methylaniline, 2-ethylaniline, 2-sec-butylaniline, 2-tert-dodecylaniline, 2-n-eicosylaniline, 4-methylaniline, 4-n-propylaniline, 4-isopropylaniline, 4-n-decylaniline, 2,4-dimethylaniline, 2,4-di-sec-octylaniline, 2,6-dimethylaniline, 2,6-diethylaniline, 2,6-di-n-propylaniline, 2,6-diisopropylaniline, 2-methyl-6-tert-butylaniline, 2-methyl-6-ethylaniline, 2-methyl-6-n-propylaniline, 2-methyl-1-naphthylamine, 2-ethyl-1-naphthylamine, 1-methyl-2-naphthylamine, 1-ethyl-2-naphthylamine, 1,3-diethyl-2-naphthylamine, and the like.

Preferred aryl-substituted aminobenzenes are those in which the aryl substituent contains 6 to about 20 carbon atoms. Examples of these are 2-phenylaniline, 2-(2,4-diisobutylphenyl)aniline, 4-phenylaniline, 4-naphthylaniline, 2,4-diphenylaniline, 2-ethyl-4-phenylaniline and 4-(4-sec-dodecylphenyl)aniline.

Preferred aralkyl-substituted aminobenzenes are those in which the aralkyl group contains from 7 to about 20 carbon atoms. Examples of these are 2-benzylaniline, 2-($\alpha$-methylbenzyl)aniline, 4-($\alpha,\alpha$-dimethylbenzyl)aniline, 4-($\alpha$-methyl-4-sec-decylbenzyl)aniline and 2-ethyl-4-($\alpha,\alpha$-dimethyl-4-tert-undecylbenzyl)aniline.

Preferred cycloalkyl-substituted aminobenzenes are those in which the cycloalkyl group contains 6 to about 12 carbon atoms. Examples of these are 2-cyclohexylaniline, 4-(4-ethylcyclohexyl)aniline, 2-ethyl-4-(4-n-propylcyclohexyl)aniline, 4-cyclooctylaniline and 2-methyl-4-(4-sec-hexylcyclohexyl)aniline.

Preferred alkoxy-substituted aminobenzenes are those in which the alkoxy group contains 1 to about 12 carbon atoms. Examples of these are 2-methoxyaniline, 4-methoxyaniline, 2-butoxyaniline, 2-ethyl-4-decoxyaniline and 2-methoxy-4-dodecoxyaniline.

Examples of halogen-substituted aminobenzenes are 2-chloroaniline, 4-chloroaniline, 2,4-dichloroaniline, 2,6-dichloroaniline, 2-bromoaniline, 4-fluoroaniline, 4-iodoaniline, 2-chloro-1-naphthylamine and 1,3-dibromo-2-naphthylamine.

The most preferred aminobenzene is 2,6-diethylaniline.

The hydrogen transfer catalyst can be any of the well-known hydrogenation-dehydrogenation catalysts. Some examples of these are platinum, palladium, ruthenium, rhodium, nickel, copper chromite, reduced copper, copper-palladium, and the like. Preferably, the catalysts are supported on a suitable support such as alumina, silica, silica-alumina, magnesia, zirconia, titania, charcoal, and the like. Examples of such supported catalysts include alumina-chromia, magnesia-chromia, alumina-molybdena, alumina-vanadia, alumina-vanadia-zinc oxide, alumina-urania, alumina-tungstate, alumina-palladium, alumina-copper-palladium, and the like. The most preferred catalyst is palladium on a suitable support such as charcoal. The amount of catalyst need only be sufficient to catalyze hydrogen exchange during the reaction. Good results are obtained using from about 1 to 10 parts by weight of hydrogen transfer catalyst (excluding support) per 1000 parts of reaction mixture.

A molar excess of water over that required to react with the aromatic amine is generally used. Good results are obtained using from about 2–100 moles of water per mole of aminobenzene. A preferred range is from about 2.5 to 50 moles of water per mole of aminobenzene.

The cyclohexanone or cyclohexylimine used as a reaction propagating agent preferably corresponds in structure with the aminobenzene. For example, cyclohexylimine and cyclohexanone correspond in structure with aniline. 2,6-Diethyl cyclohexylimine and 2,6-diethyl cyclohexanone correspond in structure with 2,6-diethylaniline, and so forth.

The amount of reaction propagating agent should be enough to cause the reaction to proceed at a good rate. A useful range is from about 0.05 to 0.5 moles of reaction propagating agent per mole of aminobenzene. A more preferred range is from about 0.1 to about 0.3 moles of reaction propagating agent per mole of aminobenzene.

The reaction propagating agent may be separately prepared and added to the aminobenzene. Preferably this agent is formed in situ by adding a reducing agent capable of reducing a portion of the aminobenzene to its corresponding cyclohexylimine. Hence, a highly preferred embodiment of the invention is a process for converting aminobenzenes to hydroxybenzenes comprising (A) reducing a portion of the aminobenzene to form a reduced mixture, (B) reacting this reduced mixture with water in the presence of a hydrogen transfer catalyst at a temperature of about 200°–400°C., and (C) recovering the hydroxybenzene product.

The reducing agent employed can be any of those known to be capable of reducing an amino aromatic to the corresponding cyclohexylimine. One such group of useful reducing agents is the hydroaromatics. These are compounds containing a 6-membered cycloaliphatic structure which can lose hydrogen and form an aromatic compound (Fieser and Fieser, *Advanced Organic Chem.*, p. 645, Reinhold Publishing Co., N.Y., 1961). Some typical examples of these are decalin, tetralin, cyclohexane, cyclohexanol, and the like. Other organic reducing agents such as hydroquinone, catechol, and the like, can also be used. Compounds that form hydrogen in contact with water are also useful. These include sodium aluminum hydride, sodium bobohydride, calcium hydride, lithium aluminum hydride, and the like.

The most preferred reducing agent is hydrogen. Thus, the reaction can be initiated by adding a small amount of hydrogen to the aminobenzene containing the hydrogen transfer catalyst sufficient to reduce a portion of the aminobenzene to form a reaction propagating amount of the corresponding cyclohexylimine. Good results can be obtained by reducing from about 5–50 mole percent of the aminobenzene. A preferred range is from 10–30 mole percent. Once this cyclohexylimine has been formed no additional reducing agent is required. The cyclohexylimine can be readily formed by placing the aminobenzene and hydrogen transfer catalyst in a reaction vessel and pressurizing the vessel with about 10–1000 psig of hydrogen and heating the mixture to about 100°C. until sufficient hydrogen has reacted to indicate formation of an adequate amount of cyclohexylimine. Hydrogenation pressure or temperature is not critical as long as the reduction takes place. Following this, the water is added and the process completed. Of course, if desired, the water can be added prior to reduction.

The reaction proceeds best at elevated temperatures. A useful range is from about 200°–400°C., and a preferred range is from about 200°–300°C.

Although not bound by any theory, it is believed that the process proceeds by establishing a redox equilibrium between: aminobenzene-cyclohexylimine-cyclohexanone-hydroxybenzene. The equilibrium involves the exchange of water, ammonia or primary amine and hydrogen. It is shown in the following equation using aniline by way of example.

If one starts with the hydroxybenzene reactant and a chain propagating amount of cyclohexanone and adds ammonia the equilibrium shifts toward the aminobenzene, as described in my application Ser. No. 123,428, filed Mar. 11, 1971. According to the present invention, I have found that by starting at the aminobenzene end and adding water and either cyclohexanone or cyclohexylimine the equilibrium shifts toward the hydroxybenzene.

The following example illustrates the manner in which the process is conducted.

EXAMPLE 1

In an autoclave was placed 298 grams of 2,6-diethylaniline and 9.6 grams of charcoal supported palladium (5% Pd). The autoclave was sealed, flushed with nitrogen and then pressurized to 500 psig with hydrogen. While stirring, it was heated to 200°C. and held at that temperature until the pressure dropped to 20 psig. It was then cooled and 100 ml of water added. It was then heated to 250°C. and held at that temperature for 5 hours. Temperature was then increased to 275°C. and after 4 hours at that temperature a small sample was withdrawn for analysis. The autoclave was cooled, vented, and 75.7 grams of 85% phosphoric acid added. It was again sealed and heated to 250°C. and stirred at this temperature for 3 hours. Temperature was then increased to 300°C., at which temperature it was stirred for 5 more hours. In addition to the above mentioned 9 hour sample, further samples were withdrawn at 11, 13 and 14 hours from the time of starting the reaction. After the reaction, the autoclave was cooled and discharged and the contents filtered. The samples which were taken during the course of the reaction were analyzed. The following table gives the analyses of these samples.

| REACTION COMPOSITION (Wt. %) | | | | | |
| --- | --- | --- | --- | --- | --- |
| | start | 9 hrs | 11 hrs | 13 hrs | 14 hrs |
| 2,6-diethylaniline | 98.5 | 74.2 | 65.6 | 54 | 50.2 |
| 2,6-diethylphenol | 0 | 17.6 | 20.7 | 29.6 | 29.9 |
| unknown A | trace | 1.7 | 1.8 | 3.9 | 8.4 |
| unknown B | 0.9 | 4.2 | 6.4 | 6.1 | 5.8 |
| unknown C | 0.2 | 2.4 | 4.8 | 4.0 | 3.1 |
| other | 0.4 | 0.1 | 0.7 | 1.4 | 2.5 |

These results show that the reaction reached equilibrium at about 13 hours, at which time is contained 29.6 weight per cent 2,6-diethylphenol. The 2,6-diethylphenol and unreacted 2,6-diethylaniline were recovered by distillation.

Phosphoric acid was added to the above example for the purpose of neutralizing evolved ammonia to force the equilibrium further towards 2,6-diethylphenol. The addition of acid is not required since the results show that the reaction mixture contained 17.6 weight per cent 2,6-diethylphenol prior to the addition of the phosphoric acid.

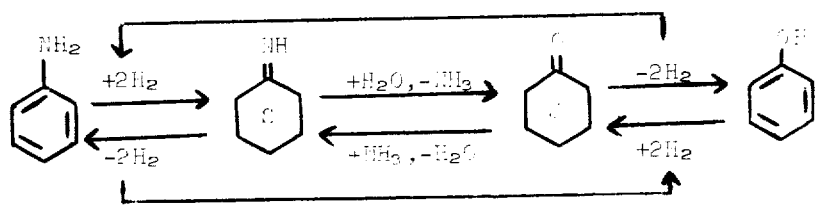

The general procedure of the above example can be followed to convert other aminobenzene starting materials to the corresponding hydroxybenzene.

I claim:

1. A process for converting the amine group of a monoaminobenzene to a hydroxy group, said monoaminobenzene having at least one hydrogen atom bonded to the amino nitrogen atom and being selected from the group consisting of unsubstituted aminobenzene and aminobenzenes substituted with substituents selected from the group consisting of alkyl, aryl, aralkyl, cycloalkyl, halogen and alkoxy, said process comprising reacting said aminobenzene with water in the presence of a hydrogen transfer catalyst selected from the group consisting of catalysts which contain a metal selected from the group consisting of platinum, palladium, ruthenium, rhodium, nickel, copper, chromium, molybdenum, vanadium and mixtures thereof, and a reaction propagating agent selected from the group consisting of cyclohexanones, cyclohexylimines and mixtures thereof at a temperature of about 200°–400°C.

2. A process of claim 1 wherein the amount of said reaction propagating agent is from about 0.05 to about 0.5 moles per mole of said aminobenzene.

3. A process of claim 1 wherein said hydrogen transfer catalyst is palladium.

4. A process of claim 1 wherein said reaction propagating agent is formed in situ by adding a reducing agent to said aminobenzene, said reducing agent being capable of reducing a portion of said aminobenzene to the corresponding cyclohexylimine.

5. A process of claim 4 wherein said reducing agent is hydrogen.

6. A process of claim 5 wherein said hydrogen transfer catalyst comprises palladium.

7. A process of claim 6 wherein said monoaminobenzene is ortho-ethylaniline.

8. A process of claim 6 wherein said monoaminobenzene is 2,6-diethylaniline.

9. A process for converting the amine group of a monoaminobenzene to a hydroxy group, said aminobenzene having at least one hydrogen atom bonded to the amino nitrogen atom and being selected from the group consisting of unsubstituted aminobenzenes and aminobenzenes substituted with substituents selected from the group consisting of alkyl, aryl, aralkyl, cycloalkyl, halogen and alkoxy, said process comprising:

A. catalytically hydrogenating a portion of said monoaminobenzene to form a reduced mixture, B. reacting said reduced mixture with water in the presence of a hydrogen transfer catalyst selected from the group consisting of catalysts which contain a metal selected from the group consisting of platinum, palladium, ruthenium, rhodium, nickel, copper, chromium, molybdenum, vanadium and mixtures thereof, at a temperature of about 200°–400°C., and C. recovering the hydroxybenzene product.

10. A process of claim 9 wherein said monoaminobenzene 2,6-diethylaniline and said catalyst comprises palladium.

* * * * *

UNITED STATES PATENT AND TRADEMARK OFFICE
CERTIFICATE OF CORRECTION

PATENT NO. : U.S. 3,919,332
DATED : November 11, 1975
INVENTOR(S) : John C. Wollensak It is certified that error appears in the above-identified patent and that said Letters Patent are hereby corrected as shown below:

In column 6, line 2 of Claim 10, insert "is" before "2,6-diethylaniline"

Signed and Sealed this seventeenth Day of February 1976

[SEAL]

Attest:

RUTH C. MASON
Attesting Officer

C. MARSHALL DANN
Commissioner of Patents and Trademarks